PROCESS FOR THE PREPARATION OF ALKYL-MERCURIC-SALTS

Heinrich Klös and Wilhelm Schacht, Wuppertal-Elberfeld, Germany, assignors to Farbenfabriken Bayer Aktiengesellschaft, Leverkusen, Germany, a corporation of Germany No Drawing. Application October 12, 1956
Serial No. 615,475

Claims priority, application Germany October 15, 1955

9 Claims. (Cl. 260—431)

This invention relates to and has as its objects a new and useful process for the preparation of alkyl-mercuric salts, especially unsubstituted lower alkyl-mercuric-salts of the formula $$R\text{—}Hg\text{—}Ac$$

in which R stands for an aliphatic radical, containing 1–4 carbon atoms and Ac stands generally for organic or inorganic acyl radicals.

Lower alkyl mercuric salts (especially the methyl- and ethyl-mercuric salts) have become important fungicides and germicides. Especially active are the methyl mercuric salts. Many processes are known for preparing these compounds, but the known methods have been found unsatisfactory, partly because inflammable or very toxic starting materials are needed. Furthermore, some methods are limited as to the number of compounds of this series which are obtainable; yields, in some processes, are too low to make the preparation methods of practical importance.

Alkyl-metal-compounds such as lead alkyls, zinc-alkyls, aluminum alkyls and the like may be used, e.g., for obtaining alkyl-mercuric salts, but these compounds are disadvantageous since they are inflammable and highly toxic. The more convenient reaction between alkyl halides and mercury-alkali metal-amalgam is not satisfactory with respect to the yield of mercuric alkyl halides. Also the reaction between alkyl magnesium salts and mercuric salts has some disadvantage insofar as this reaction is complicated in preparing the reaction compounds in larger scale. Furthermore, this reaction is not generally applicable and results in low yields.

The reaction between aluminum carbide and mercuric salts in the presence of acids is only applicable for the preparation of methyl mercuric salts and is also unsatisfactory with respect to the yields of these products.

During most of these known processes for obtaining alkyl mercuric salts there are obtained also as inevitable byproducts, volatile and toxic dialkyl mercuric compounds which have to be removed by complicated means. Also many processes for obtaining alkyl mercuric halides, especially mercuric chlorides, are known from which compounds other alkyl mercuric salts may be obtained. But especially alkyl mercuric halides and particularly lower alkyl mercuric chlorides are extremely volatile at room temperature; and since they are very poisonous too, there is also some disadvantage to use these halides for producing other alkyl-mercuric salts. This is especially true for the production of the very interesting lower alkyl-mercuric compounds.

In accordance with the present invention, it has been found that alkyl-mercuric salts, especially lower alkyl mercuric salts may be obtained very easily by reacting alkyl-sulfinic acids or their salts or esters with appropriate mercuric salts. This reaction preferably should be carried out at slightly elevated temperatures in an approximately neutral reaction medium or at least at a slightly acidic pH-range. The reaction is generally applicable to a large number of mercuric salts, thus, making it generally suitable for obtaining alkyl-mercuric salts. Not only mercuric salts of oxygen-containing acids of organic or inorganic nature may be obtained but also alkyl-mercuric salts of hydrogen-halides are obtainable by this method. The alkyl-mercuric salts which are formed generally bear the same anion as the mercuric salt used in the reaction. This method is especially advantageous for obtaining slightly volatile or non-volatile or water-soluble alkyl-mercuric salts.

It has further been found that not only alkyl-sulfinic acids react with mercuric salts to eventually yield the desired alkyl-mercuric salts but also mixed salts of alkyl-mercuric sulfinic acids yield the same reaction products. In the mixed salts, of course, one valence bond of the mercury bears the alkyl-sulfinic acid residue and the other valence bond bears the residue of the appropriate or desired anion, either of organic or inorganic nature. An example of such mixed compounds is the chloromercuric salts of methane sulfinic acid, $$CH_3\text{—}SO_2\text{—}Hg\text{—}Cl$$

Other such mixed compounds are those of the formulae $$C_2H_5\text{—}SO_2\text{—}Hg\text{—}Cl;\ [CH_3\text{—}SO_2\text{—}Hg]_2\text{—}SO_4;$$

$$C_2H_5\text{—}SO_2\text{—}Hg\text{—}OOCCH_3\text{ and }CH_3\text{—}SO_2\text{—}Hg\text{—}NO_3.$$

It should be understood, however, that any compound of this type may be used in this process, thus making also this special reaction generally applicable for obtaining alkyl-mercuric salts.

Alkyl-mercuric salts which are obtainable according to the present invention include generally salts of organic or inorganic nature. As special examples, there may be mentioned salts of hydrochloric acid, hydrogromic acid, nitric acid, sulfuric acid, phosphoric acid or organic acids such as formic acid, acetic acid, trichloracetic acid, propionic acid, maleic acid, benzoic acid, p-chloro-benzoic acid, naphthalene-carboxylic acid, pyridine carboxylic acids and the like. As pointed out the reaction is preferably carried out at elevated temperatures, i.e. between about 80° and 180° C., preferably between 90° and 130° C. At much lower temperatures the inventive reaction is very slow and at much higher temperatures side reactions and decomposition take place.

Preferably the reaction between the mercuric salt and alkyl-sulfinic acid and the reaction of alkyl-sulfinic-acid-mercuric salt should be carried out in suitable inert solvents. It is of special advantage to use solvents which have a boiling point in the preferred reaction temperature range. Carrying out this reaction in such solvents, no pressure is needed and by using a slight vacuum, a small amount of toxic gases may be safely removed. Most suitable of the solvents, in many cases, is water. However, alcohols, especially lower aliphatic or cycloaliphatic alcohols, having up to 6 carbon atoms, dioxane, or mixtures thereof with water, etc. may be used in carrying out the inventive reaction.

The alkyl mercuric salts are normally isolated in the usual manner, i.e. by filtering by suction from liquids in which they are relatively insoluble. If necessary, they may later be recrystallized. To recover soluble alkyl mercuric salts they can be transformed into sparingly soluble or insoluble derivatives e.g. the acetylides. Some alkyl mercuric salts may be purified, as known, also by steam distillation or by extraction with other suitable solvents followed by evaporation of the solvents.

The yields of the alkyl mercuric salts prepared according to the inventive process are generally very good. There is no substantial loss of mercury in this process and highly toxic and volatile dialkyl mercuric compounds are not formed. Since alkyl-sulfinic acids are very easily obtainable, this new process becomes of practical importance.

Pure salts of alkyl sulfinic acids are not necessary for use in the invention. It is well to generally use solutions of salts of alkyl sulfinic acids as they are obtained without purification. Since the sulfinic acid content is easily determinable by titration methods, there is no difficulty in determining the amount of mercuric salts necessary for reaction. If it is desired to obtain water soluble and only slightly volatile alkyl mercuric salts, it is then necessary that such solutions do not contain halogen ions, since the presence of these halogen ions yields alkyl mercuric halides which are very volatile and nearly insoluble in water.

The reaction of alkyl mercuric salts according to this invention may be shown by the following general formula:

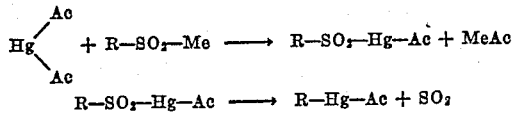

$$R-SO_2-Hg-Ac \longrightarrow R-Hg-Ac + SO_2$$

R stands in these formulae for any lower unsubstituted alkyl-residue, preferably from 1–4 carbon atoms, Ac stands for organic or inorganic acyl radicals (e.g.: Cl—; $NO_3$—; $CH_3COO$—; Br—; etc.) and Me stands for a salt-forming radical such as an alkali or alkaline earth group radical (e.g. sodium, potassium, magnesium, calcium, ammonium and the like).

The reaction medium is preferably about in a neutral pH range. However, a slightly acidic pH may also be used (about 3 to about 7) and usually will not affect the yields seriously. Strong acidic solutions set free alkyl sulfinic acids from their salts, thus, leading to decompositions prior to reaction with mercuric salts. Also the mercuric salts may be reduced to mercurous salts or even to free mercury. An alkaline reaction medium on the other hand should be avoided too, since thereby mercury oxide is formed which is unable to react with alkyl sulfinates. Further, some volatile and toxic dialkyl mercuric compounds may be formed in an alkaline reacting medium.

If alkyl mercuric halides are to be prepared by the inventive methods, $SO_2$ which splits off during the reaction does not affect substantially the yield of reaction products. The $SO_2$ escapes and the mercuric alkyl halide precipitates and may be separated. Also the intermediate formed mercuric-sulfinate-halides are insoluble and do not react with the $SO_2$ which split off. Water-soluble salts of divalent mercury and oxygen-containing acids behave quite differently. These salts e.g. the nitrate, sulfate or acetate, are partially hydrolyzed in water, react acidic and contain in addition colored basic mercury salts. If solutions of such salts are treated with salts of sulfinic acids free sulfinic acids may be formed which reduce at first the mercuric salts to the mercurous salt or even to mercury instead of forming the desired mixed salt. This may be shown by the following equation:

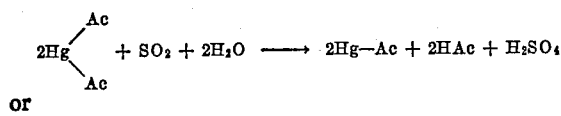

or

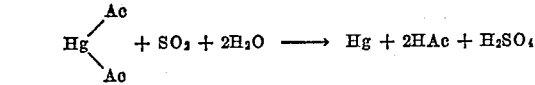

and

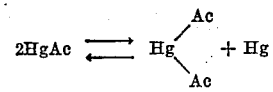

Not only is a substantial part of the starting materials thereby lost but also further acid is formed which gives still lower yields of reaction products in this inventive process e.g. as low as 35–40% of theoretical.

Water soluble and hydrolyzable salts of the divalent mercury being of importance as reacting materials (they do not lead to volatile alkyl-mercuric salts), this inventive process has as its special advantage the possibility of preventing substantially these side reactions.

This may be seen from the following equation:

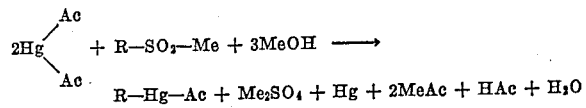

$$R-Hg-Ac + Me_2SO_4 + Hg + 2MeAc + HAc + H_2O$$

Preferably, however, 2 moles of water soluble salts of divalent mercury are reacted with about 1.1 to 1.4 equivalents of sulfinic acid and about 1.8 to 2.5 of equivalent amount of alkali metal hydroxide since during the reaction the $SO_2$ partially escapes without reducing the starting material (and thus increasing the acidity of the reaction medium). Advantageously the acidic solution (pH about 3–4) or suspension of water soluble divalent mercuric salts is partially neutralized at the beginning, but this solution should still be just acidic to Congo red. The rest of the alkali metal hydroxide then should be added with the alkyl sulfinic acid salt solution. According to this procedure, optimum yields are obtained.

The reaction of mercuric salts with sulfinic acids is known from the literature only in case of aromatic compounds and mercuric chloride, yielding 12% of the theory of the desired reaction product. It is very surprising that in reacting alkyl sulfinic acid with all mercuric salts—also water-soluble ones—this reaction takes place in such average good yields as are obtained by this inventive process, especially since it is well known, that mercury reacts much easier with aromatic than with aliphatic compounds. In the J. Chem. Soc. (London), 1939, pages 1066–1067 there is described, that ethoxy ethyl sulfinic acid and mercuric chloride as well may react to give the mixed salt: $C_2H_5OC_2H_4SO_2HgCl$ but this salt never could be reacted to yield the ethoxy ethyl mercuric chloride. On the contrary, complete decomposition occurs.

The following examples are given by way of illustration only without, however, restricting this invention thereto.

*Example 1*

A solution of 50 g. sodium methyl sulfinate in 200 ml. ethanol is mixed with a solution of 135 g. mercuric chloride in 600 ml. ethanol. Instantly a white precipitate is formed. After adding 30 g. acetic acid the reaction mixture is heated to boiling in an oil bath, simultaneously introducing steam in the reaction mixture. After all the ethanol has been distilled off the reaction mixture slowly decomposes, splitting off $SO_2$, and methyl mercuric chloride is distilled over with steam continuously. Steam distillation is continued until no precipitate is obtained by treating the steam distillate with potassium iodide. The precipitate in the reaction container slowly disappears. The oil bath temperature during the steam distillation is adjusted to about 160 to 180° C. The liquid volume should be adjusted to 500 ml., if necessary by adding small amounts of water. The methyl-mercuric chloride is filtered with suction, further crops of compound may be obtained as methyl mercuric iodide by adding potassium iodide to the filtrate. The average yield amounts to 70% of theory (referred to mercuric chloride used in the reaction). The residual solution in the reaction container still contains inorganic mercury salts which may be recovered by usual methods. The methyl mercuric chloride in the above-mentioned filtrate may also be converted to bis-methyl mercuric acetylide by introducing acetylene in the slightly alkaline solution. This acetylide may be converted to a further crop of methyl mercuric chloride by treating it with hydrochloric acid.

Example 2

If, instead of 50 g. of the sodium salt of methyl sulfinic acid 57 g. of the sodium salt of ethyl sulfinic acid are used, there are obtained 75% of theoretical of ethyl mercuric chloride following the method of preparation described in the foregoing example. The percentage again is referred to the amount of mercuric chloride used in the reaction.

Example 3

100 g. anhydrous mercuric nitrate (or the equivalent amount of the crystallized hydrate) are stirred with 2 liters of distilled water; only a small amount of the nitrate solubilizes. After adding a solution of 37 g. of the sodium salt of halogen-free ethyl sulfinic acid (95%) in 400 ml. distilled water at room temperature, a clear solution is obtained from which later white crystals begin to precipitate. The solution is strongly acidic and is partially neutralized by adding a solution of 4.5 g. sodium hydroxide in 20 ml. water. After this addition, the first white precipitate becomes slightly reddish brown in color and increases at the same time. The mixed sulfinic acid mercury salt is filtered with suction and suspended in 1.2 liters distilled water. The filter dry cake amounts to about 87 to 90 g. The aqueous suspension is heated under reflux to gently boiling whereby the colour changes from reddish to grey. After cooling the remaining solution is decanted from the mercury. The decanted solution is made strongly alkaline and then filtered to separate the precipitated mercuric (or mercurous) oxide. The remaining clear solution still contains ethyl mercuric hydroxide. It is acidified with a solution of acetic acid, then treated with a solution of 25 g. sodium chloride in 200 ml. water. Ethyl mercuric chloride (about 27 g.) separates which may be isolated and recrystallised from ethanol (M.P. 191–192° C.). If instead of sodium chloride the equivalent amount of potassium bromide or iodide is used, there are obtained the corresponding ethyl mercuric bromide or iodide.

Example 4

A mixture of 200 g. anhydrous mercuric sulfate and 1.5 liters water (distilled) is treated with a solution of 9 g. sodium hydroxide in 40 ml. water while stirring. The yellow colour of the mixture becomes slightly darker and the mixture still is acidic to Congo red. The mixture is heated to 99–105° C. and with further heating, treated with a chloride-free solution of 50 g. sodium methyl sulfinate (90%) and 24 g. sodium hydroxide in 600 ml. water. This addition should take about half an hour and the reaction temperature should be adjusted to about 98° C. Small portions of water distill over and the colour of the reaction mixture slowly changes to grey. After having kept a temperature of about 99°–105° C. for 2 hours further, the mixture is cooled and treated with 40% sodium hydroxide solution until the mixture reacts basic (phenolphthalein). The mixture then is filtered with suction and the residue, mainly comprising a mixture of mercury and its oxide is washed twice with small amounts of water.

In the filtrate are determined by titration 68 g. to 75 g. mercury in the form of methyl mercuric hydroxide. This solution may be used as such for fungicidal or germicidal sprays, or either may be converted to a suitable water-soluble salt. According to the description of Example 3, it is also possible to isolate a convenient water insoluble salt from this hydroxide-solution (e.g. the acetylide, by introducing gaseous acetylene in the alkaline reaction mixture).

Example 5

200 g. mercuric acetate are dissolved in 900 ml. water (distilled) at a temperature within the range of about 99–105° C. There are added 51 g. of the sodium salt of ethyl sulfinic acid, dissolved in 600 ml. distilled water (halogen free) within about 30 mins. The sulfinic acid salt solution further has to contain 28 g. sodium hydroxide. The mixture becomes slightly turbid and grey. The reaction temperature is maintained for 1 to 2 additional hours. After cooling and filtering, the mixture is further treated according to Example 4. In the final solution the ethyl mercuric hydroxide is determined also as described in Example 4. 61.5 g. mercury are found which corresponds to 73.6% (related to the sodium salt of ethyl sulfinic acid).

Example 6

320 g. mercuric chloride are dissolved in 1800 ml. ethanol and 181 g. sodium butyl sulfinate (94%) dissolved in 2 liters hot ethanol are added. Sodium chloride and the mixed butyl sulfinic acid mercuric chloride salt precipitate. The ethanol is removed by distillation, 500 ml. water are added and steam of 190°–200° C. is blown through the mixture. Care should be taken that the liquid volume is kept at the original volume. Foam occurs by splitting off $SO_2$ and butyl mercuric chloride distills over with the steam. After the steam distillate no longer contains butyl mercuric chloride the distillation is continued for another 20 minutes. The crude reaction product is filtered with suction and recrystallized from ethanol. There are obtained 197 g., melting at 127°–128° C. From the filtrate a second small crop of butyl mercuric salt may be isolated as acetylide as described in the previous examples.

We claim:

1. A process for the production of alkyl mercuric salts which comprises reacting a member selected from the group consisting of salts and esters of lower alkyl sulfinic acids and a divalent mercury salt at a pH-range from about pH 3 to about pH 7.5 and at a temperature from about 80° C. to about 200° C.

2. A process for the production of alkyl mercuric salts according to claim 1, in which water-insoluble divalent mercury salts are used.

3. A process for the production of alkyl mercuric salts according to claim 1 in which water-soluble divalent mercury salts are used.

4. The process of claim 1 wherein about 1.5 to about 1.8 mol divalent mercury salt, 1 equivalent lower alkyl sulfinic acid and about 1.6 to 2.5 equivalent neutralizing agents are used.

5. A process for the preparation of methyl mercuric chloride which comprises reacting sodium methyl sulfinate with mercuric chloride in an acidified alcoholic solvent heated to the boiling point, and continuously removing the alcohol from the reaction mixture by steam distillation.

6. A process for the preparation of ethyl mercuric chloride which comprises reacting ethyl sulfinic acid with mercuric chloride in an acidified alcoholic solvent heated to the boiling point, and continuously removing the alcohol from the reaction mixture by steam distillation.

7. A process for the preparation of ethyl mercuric chloride which comprises adding an aqueous solution of ethyl sulfinic acid to mercuric nitrate, partially neutralizing the solution, forming as a precipitate a mixed sulfinic acid-mercury salt, filtering the latter and suspending it in water, heating under reflux to boiling, cooling, decanting the remaining solution, and raising the pH of the solution to the alkaline side and filtering off the precipitated mercuric oxide, thereby leaving a solution of ethyl mercuric chloride.

8. A process for the preparation of methyl mercuric hydroxide which comprises mixing sodium methyl sulfinate with a hot acidic solution of mercuric sulfate, maintaining the reaction temperature at about 98° C. for several hours, cooling the reaction mixture and adjusting its pH to the alkaline side, and filtering the mixture to remove as residue the mercuric oxide and to recover as the filtrate the methyl mercuric hydroxide.

9. A process for the preparation of butyl mercuric chloride comprising dissolving mercuric chloride and sodium butyl sulfinate in hot ethanol to form a precipitated reaction product, distilling off the ethanol, and then steam-distilling the butyl mercuric chloride from the reaction mixture.

References Cited in the file of this patent

Peters: Ber. (1905), 38, p. 2567.
Kharasch et al.: Jour. Am. Chem. Soc. (1921), 43, pp. 607–9.
Whitmore et al.: Jour. Am. Chem. Soc. (1923), 45, pp. 1066–68.
J. Chem. Soc. (London), 1939, pp. 1066–1067.